(12) United States Patent
Ohlson

(10) Patent No.: US 6,351,503 B1
(45) Date of Patent: Feb. 26, 2002

(54) THRESHOLD EXTENSION BLOCK PHASE ESTIMATOR FOR QUASI-COHERENT COMMUNICATIONS SYSTEMS

(75) Inventor: John Ohlson, Mt. View, CA (US)

(73) Assignee: Stanford Telecommunications, Inc., Sunnyvale, CA (US)

( * ) Notice: Subject to any disclaimer, the term of this patent is extended or adjusted under 35 U.S.C. 154(b) by 0 days.

(21) Appl. No.: 09/150,241

(22) Filed: Sep. 10, 1998

Related U.S. Application Data

(60) Provisional application No. 60/058,860, filed on Sep. 12, 1997.

(51) Int. Cl.[7] .............................................. H04L 27/22
(52) U.S. Cl. ....................... 375/332; 375/326; 375/147; 375/281
(58) Field of Search ................................ 375/332, 279, 375/280, 281, 329, 324, 326, 327, 344, 322, 371, 373, 261, 283, 298, 308, 330, 331, 130, 140, 141, 146, 147; 329/304, 306, 307, 308; 332/103

(56) References Cited

U.S. PATENT DOCUMENTS

| | | | | |
|---|---|---|---|---|
| 5,303,269 A | * | 4/1994 | Atles | 375/322 |
| 5,491,724 A | | 2/1996 | Altes | 375/322 |
| 5,619,537 A | * | 4/1997 | Altes | 375/322 |
| 5,638,361 A | | 6/1997 | Ohlson | 370/342 |

* cited by examiner

*Primary Examiner*—Betsy L. Deppe
(74) *Attorney, Agent, or Firm*—Jim Zegeer

(57) ABSTRACT

The invention relates to a threshold extension block phase estimator (TEBPE) which estimates phase in the presence of noise. Threshold and sector slips are controlled by an iterative calculation. This can be of crucial advantage in coded systems. Another attribute of the TEBPE is it can be configured as a hybrid feedback loop incorporating characteristics of both the BPE and the PLL. This gives a high degree of flexibility with very fast acquisition times at high signal-to-noise ratio (SNR), and improved threshold performance at low SNR.

4 Claims, 3 Drawing Sheets

THRESHOLD EXTENSION BLOCK PHASE ESTIMATOR FOR QUASI-COHERENT COMMUNICATIONS SYSTEMS

This application is the subject of provisional application Serial No. 60/058,860 filed Sep. 12, 1997 entitled AN IMPROVED THRESHOLD EXTENSION BLOCK PHASE ESTIMATOR FOR QUASI-COHERENT COMMUNICATIONS SYSTEM.

DESCRIPTION OF THE PRIOR ART

The phase-locked loop (PLL) has for many years been the technique-of-choice for estimating received carrier phase in coherent m-ary phase-shift keyed (MPSK) communications systems. With advances in technology and the proliferation of burst communications systems, block phase estimators (BPE), began to be used to avoid "hang-up" problems encountered during PLL signal acquisition. The BPE for higher order modulations must be preceded by a nonlinearity to remove the effects of modulation, and is followed by a "sector tracking" algorithm to maintain the full range of the output phase estimate. This configuration is susceptible to "sector slips" just as a PLL experiences "cycle slips".

OBJECT OF THE INVENTION

The object of the invention is to provide an improved block phase estimator. More particularly, an object of the invention is to provide a threshold extension block phase estimator (TEBPE) which gives improved performance over existing BPE algorithms in the presence of noise. Specifically, the threshold and sector slip performance is superior to that of previously disclosed algorithms. This can be of crucial advantage in coded systems. Another attribute of the TEBPE is it can be configured as a hybrid feedback loop incorporating characteristics of both the BPE and the PLL. This gives a high degree of flexibility with very fast acquisition times at high signal-to-noise ratio (SNR), and improved threshold performance at low SNR.

DESCRIPTION OF THE DRAWINGS

The above and other objects, advantages and features of the invention will become more apparent when considered with the following specification and accompanying drawings wherein.

DESCRIPTION OF THE INVENTION

Description of the TEBPE

The estimator of the present invention, designated hereby the acronym TEBPE, is described by the equation:

$$\hat{\theta} = \tan^{-1}\left[\frac{\sum_k (y_k \overline{D}_k - x_k \overline{E}_k)}{\sum_k (x_k \overline{D}_k + y_k \overline{E}_k)}\right] \quad \text{Eq. 1}$$

where $$\overline{D}_k = \tanh(P_k \cos(\phi_k - \theta)) \quad \text{Eq. 2}$$

$$\overline{E}_k = \tanh(P_k \sin(\phi_k - \theta))$$

$$P_k = \frac{A r_k}{\sigma_k^2}$$

with the input signal given by $$s_k = x_k + j y_k = r_k \exp(j\phi_k)$$

$$x_k = A[D_k \cos(\theta_k) - E_k \sin(\theta_k)] + n_k \quad \text{Eq. 3}$$

$$y_k = A[D_k \sin(\theta_k) + E_k \cos(\theta_k)] + m_k$$

Definitions:
- $\theta_k$ Input signal phase
- $\phi_k$ Phase of signal plus noise
- $r_k$ Amplitude of signal plus noise
- $n_k$ Input noise
- $m_k$ Quadrature noise.

where A is the signal amplitude, and $D_k$ and $E_k$ are the in-phase and quadrature data streams with value ±1.

The noise variance is $$\text{var}(n_k) = \text{var}(m_k) = \sigma_n^2 \quad \text{Eq. 4}$$

Substituting for $\overline{D}_k$ and $\overline{E}_k$, $x_k$, and $y_k$ in Equation 1 results in a transcendental equation with the dependent variable $\overline{\theta}$ on both sides of the equation. These equations can be shown to represent the maximum a posteriori block estimator for the carrier phase of a QPSK signal.

In Equation 1 K samples of $S_k$ are used to compute $\overline{\theta}$, however this computation requires that $\overline{\theta}$ be known. This type of equation is generally solved in an iterative manner using an initial estimate of $\overline{\theta}$. In order to gain some intuitive insight, it is useful to represent the above equations in block diagram form. This is most conveniently done using complex notation as shown in the block diagram representation shown in FIG. 1.

Equation 1 is solved by the feedback loop of FIG. 1 in an iterative manner as follows. The initial value of $\overline{\theta}$ is set to zero or some other estimated value. A group of K samples of $S_k$ is then input to the loop and the K values of $V_2(k)$ are computed sequentially and summed. The quantity $\exp(-j\overline{\theta})$ is then computed and the process repeated (for the same K samples of $S_k$) with this new value. This iterative process is continued until there is no significant change in $\overline{\theta}$.

Figure 1:
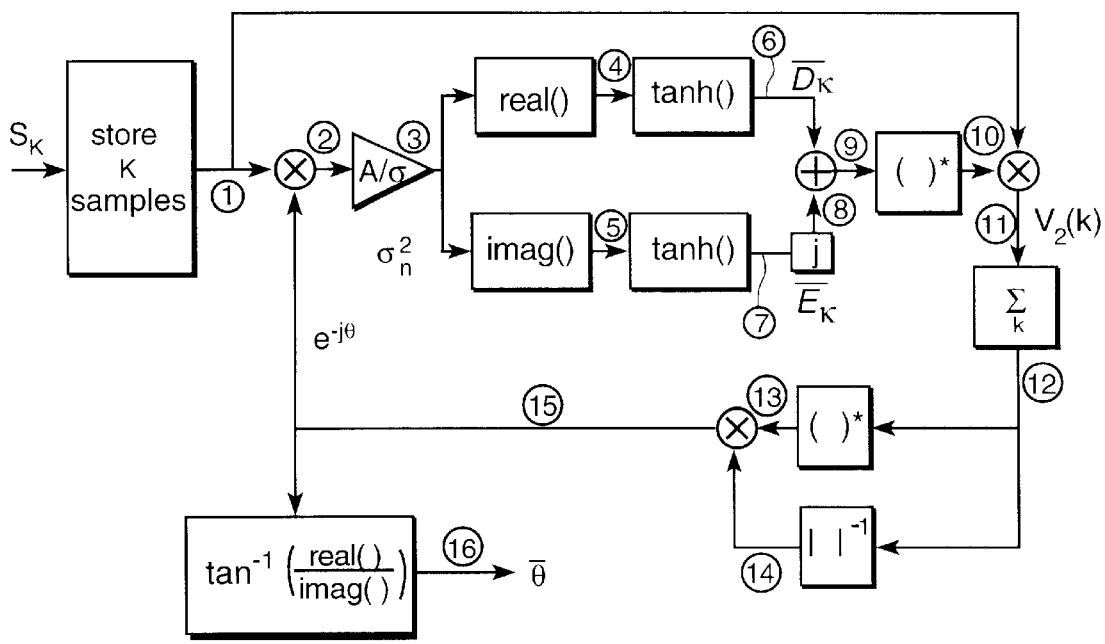
FIG. 1 is a block diagram representation of the TEBPE equations.

The circle numbered outputs of the blocks of FIG. 1 are as follows:
① Block of K samples
② Multiplication of inputs 1 and 15
③ Gain of $A/\sigma_n^2$ applied to input
④ Real part of ③
⑤ Imaginary part of ③

⑥ tanh( ) of ④
⑦ tanh( ) of ⑤
⑧ 90° phase shift of ⑦
⑨ Sum of ⑥ and ⑧
⑩ Complex conjugate of ⑨
⑪ Product of 1 and ⑩
⑫ Sum of K values of ⑪
⑬ Complex conjugate of ⑫
⑭ Inverse of absolute value of ⑫
⑮ Product of and ⑬ and ⑭
⑯ Phase angle of ⑮.

TEBPE Performance in AWGN

Figure 2:
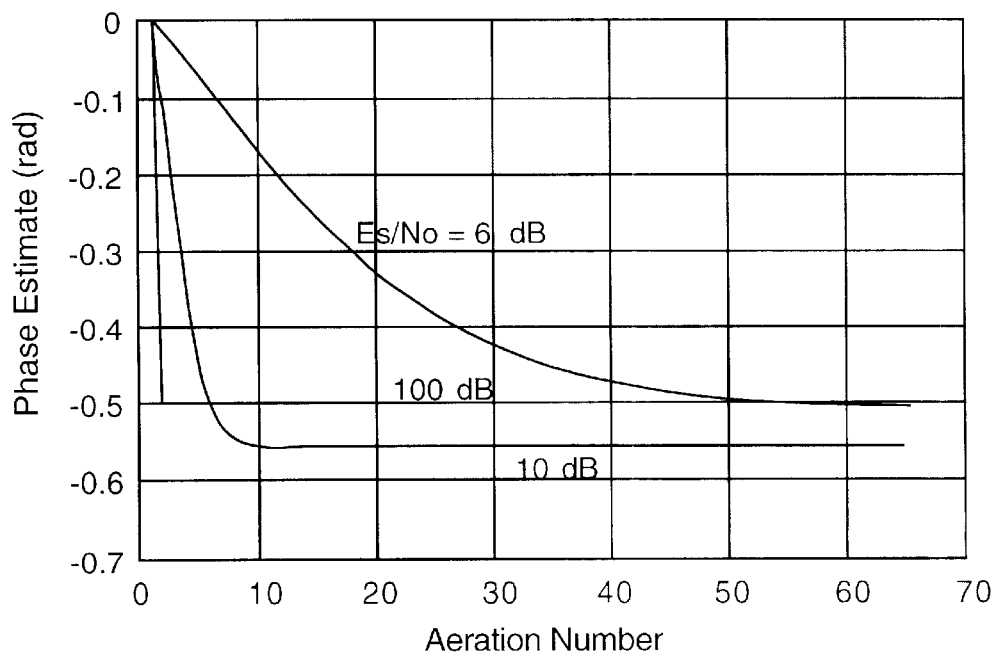
FIG. 2 is a graph illustrating typical simulation results showing estimator output versus the iteration number of different values of Es/No where the initial phase offset is −0.5 rad and K=32.

The TEBPE has been simulated for a square root raised cosine filtered (SRRC) QPSK system with excess bandwidth of α=0.4. Typical simulation results showing estimator output versus the iteration number are shown in FIG. 2 for different values of Es/No. At high SNR, the estimator settles in one iteration. At Es/No=10 dB and 6 dB, the estimator requires about 10 and 60 iterations respectively to reach final value. In general, the number of iterations required to reach the final estimate increases as input SNR decreases.

Figure 3:
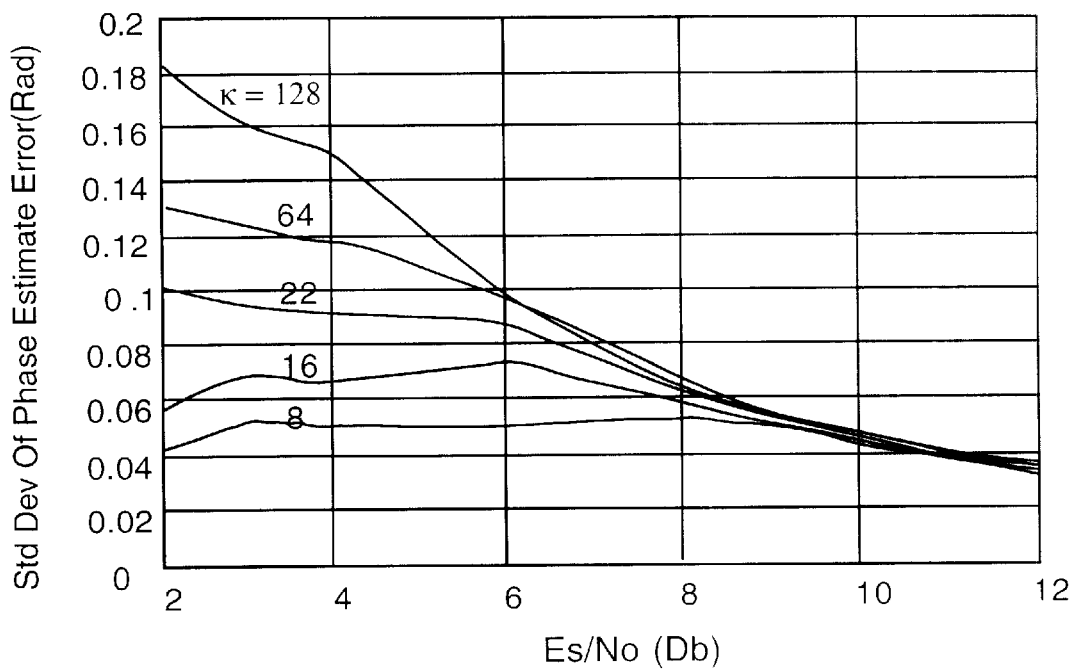
FIG. 3 is a graph illustrating typical simulation results showing the standard deviation of the phase estimate with number of iterations as a parameter and block length K=32.

The performance of the TEBPE versus Es/No is shown in FIG. 3 with K=32 for different numbers of iterations between estimates. For high signal-to-noise ratio, the estimator settles quickly as discussed above, and additional iterations do not improve performance. However, as the SNR decreases, more iterations are required to reach a steady-state estimate and the results diverge for the different iteration values. If the number of iterations is not sufficient to achieve a steady-state estimate in one block length, then the estimator settles over multiple blocks which, in effect, increases the block length. If one thinks of the estimator as a locked-loop, the longer settling time is equivalent to a lower loop bandwidth. In FIG. 3, the longer effective block length offsets decreasing Es/No so that performance is relatively flat for lower Es/No and a fixed number of iterations. The improved performance for fewer iterations is achieved at the expense of longer acquisition time.

The TEBPE, as described by Equation 1, is optimum for a QPSK signal in the presence of AWGN and the absence of frequency offset. It differs from conventional BPE's in the nonlinearity used to remove the effect of data modulation, as well as dependence of the solution on the phase estimate itself. Note that the TEBPE does not require a separate sector tracking operation as does the times-four block phase estimator (X4BPE).

Simulation results for K=32 and Es/No=9 dB indicate that the TEBPE and the X4BPE have essentially identical tolerance for input frequency offset. In this case, both estimators began to show evidence of sector slip at a normalized offset of ferr/Rs≧0.003. In practical systems, the X4BPE is operated in conjunction with an automatic frequency control loop (AFC) in order to keep the frequency offset within acceptable limits. Since the TEBPE has similar frequency accuracy constraints, it would generally be augmented with an AFC loop also.

Figure 4:
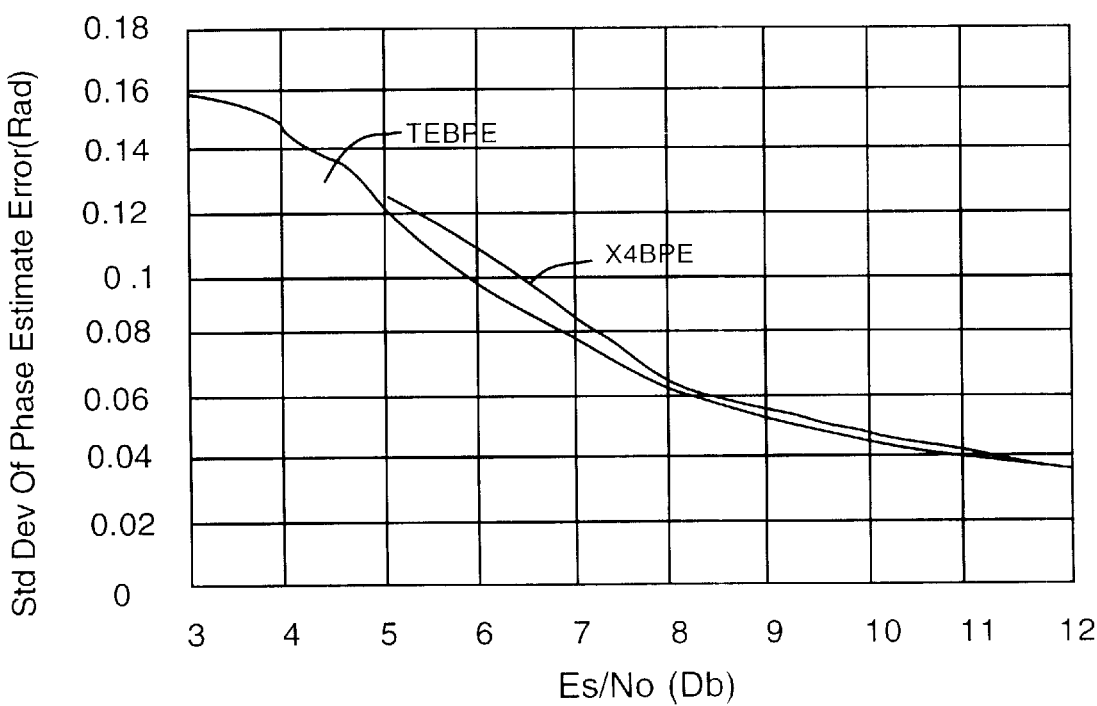
FIG. 4 is a graph illustrating simulation results comparing the standard deviation of the phase estimate (with sector slips removed) for the TEBPE and the X4BPE for a block length K=32, and 128 iterations for the TEBPE.
Figure 5:
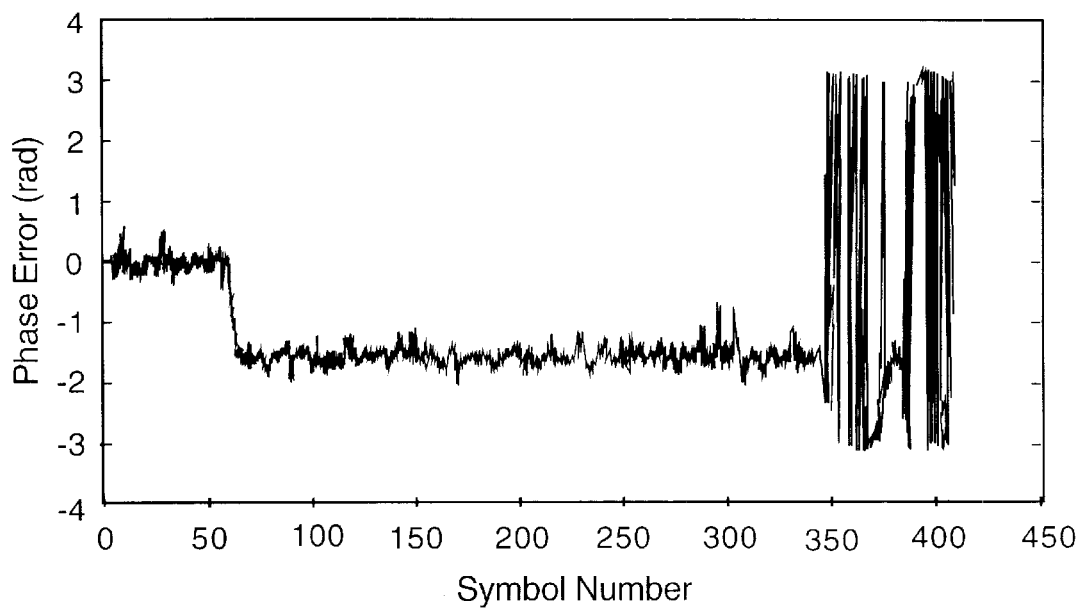
FIG. 5 is a graph illustrating X4BPE phase error versus time at Es/No=4 dB (K=32) shows several sector slips.
Figure 6:
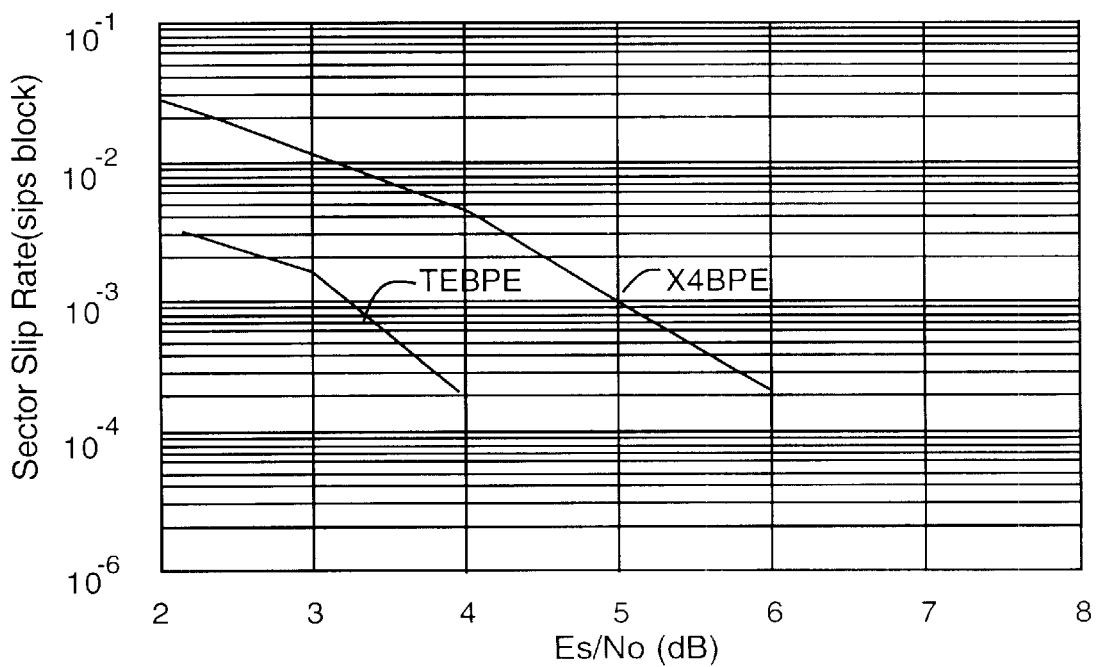
FIG. 6 is a graph illustrating comparison of sector slip rates for the TEBPE and the X4BPE with block length K=32 and 128 iterations for the TEBPE. Note the 2 dB improvement for the TEBPE over the X4BPE.

The noise performance of the TEBPE and the X4BPE is compared in FIG. 4. The standard deviation of the phase error (with sector slips removed) is nearly identical for the two estimators for the same block length. However, there is considerable difference in sector slip performance. The X4BPE exhibits frequent sector slipping at Es/No=4 dB as shown in FIG. 5 (the toggling between +pi and −pi radians is due to phase "wrap-around" and can be ignored), while the TEBPE does not. Sector slip rates for the X4BPE and the TEBPE are compared in FIG. 6. The sector slip rate is computed from simulation results as the number of sector slips that occur over a sequence of estimation blocks divided by the number of blocks. The results shown for a length 32 estimation block show a 2 dB improvement for the TEBPE over the X4BPE. This 2 dB difference in threshold is particularly significant in spread spectrum CDMA voice systems such as IS-95 which operate in this Es/No range. Note that longer block lengths will give lower thresholds.

The block diagram of FIG. 1 suggests that the TEBPE can be configured as a type of phase-locked loop (PLL), but without an NCO (in most cases, an AFC loop, which includes an NCO, must be operated in parallel to track frequency offset). The loop, as shown, could be operated to update every sample, or every N samples. In this case, the effective loop bandwidth will depend on the number of iterations between updates, as well as the Es/No.

While the invention has been described in relation to preferred embodiments of the invention, it will be appreciated that other embodiments, adaptations and modifications of the invention will be apparent to those skilled in the art.

What is claimed is:

1. In a communication system where QPSK modulation is used to transmit data on a carrier frequency, the improvement wherein a carrier frequency phase reference is derived using a threshold extension block phase estimator (TEBPE) as described by the following equations:

$$\hat{\theta} = \tan^{-1}\left[\frac{\sum_k (y_k \overline{D}_k - x_k \overline{E}_k)}{\sum_k (x_k \overline{D}_k + y_k \overline{E}_k)}\right]$$

where $$\overline{D}_k = \tanh(P_k \cos(\phi_k - \overline{\theta}))$$

$$\overline{E}_k = \tanh(P_k \sin(\phi_k - \overline{\theta}))$$

$$P_k = \frac{Ar_k}{\sigma_k^2}$$

with and input signal given by $$s_k = x_k + jy_k \exp(j\phi_k)$$

$$x_k = A[D_k \cos(\theta_k) - E_k \sin(\theta_k)] + n_k$$

$$y_k = A[D_k \sin(\theta_k) + E_k \cos(\theta_k)] + m_k$$

where A is the signal amplitude, and $D_k$ and $E_k$ are the in-phase and quadrature data streams with value ±1, $\theta_k$ is an input signal phase, $\phi_k$ is a phase of a signal plus noise, $r_k$ is an amplitude of a signal plus noise, $n_k$ is an input noise, $m_k$ is a quadrature noise, and the noise variance is $$\text{var}(n_k) = \text{var}(m_k) = \sigma_n^2.$$

2. In a spread spectrum communication system where QPSK modulation is used to transmit data on a carrier frequency, the improvement wherein a carrier frequency phase reference is derived using a threshold extension block phase estimator (TEBPE) as characterized by the following equations:

$$\hat{\theta} = \tan^{-1}\left[\frac{\sum_k (y_k \overline{D}_k - x_k \overline{E}_k)}{\sum_k (x_k \overline{D}_k + y_k \overline{E}_k)}\right]$$

where $\overline{D}_k = \tanh(P_k \cos(\phi_k - \overline{\theta}))$ $\overline{E}_k = \tanh(P_k \sin(\phi_k - \overline{\theta}))$ $P_k = \dfrac{A r_k}{\sigma_k^2}$ with the input signal given by $s_k = x_k + j y_k = r_k \exp(j\phi_k)$ $x_k = A[D_k \cos(\theta_k) - E_k \sin(\theta_k)] + n_k$ $y_k = A[D_k \sin(\theta_k) + E_k \cos(\theta_k)] + m_k$ where A is the signal amplitude, and $D_k$ and $E_k$ are the in-phase and quadrature data streams with value ±1, and the noise variance is $\mathrm{var}(n_k) = \mathrm{var}(m_k) = \sigma_n^2.$ 3. In a communication system where QPSK modulation is used to transmit data on a carrier frequency, the improvement wherein a carrier frequency phase reference is derived using a threshold extension block phase estimator (TEBPE).

4. In a spread spectrum communication system where QPSK modulation is used to transmit data on a carrier frequency, the improvement wherein a carrier frequency phase reference is derived using a threshold extension block phase estimator (TEBPE).

* * * * *